United States Patent
Bjorner et al.

(10) Patent No.: US 9,424,157 B2
(45) Date of Patent: Aug. 23, 2016

(54) EARLY DETECTION OF FAILING COMPUTERS

(71) Applicant: Microsoft Corporation, Redmond, WA (US)

(72) Inventors: Nikolaj Bjorner, Woodinville, WA (US); Assaf Schuster, Haifa (IL); Moshe Gabel, Haifa (IL); Ran Gilad-Bachrach, Bellevuw, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 14/204,948

(22) Filed: Mar. 11, 2014

(65) Prior Publication Data

US 2014/0195860 A1 Jul. 10, 2014

Related U.S. Application Data (63) Continuation of application No. 12/965,934, filed on Dec. 13, 2010, now Pat. No. 8,677,191.

(51) Int. Cl.
G06F 11/00 (2006.01)
G06F 11/30 (2006.01)
G06F 11/07 (2006.01)

(52) U.S. Cl.
CPC ........ G06F 11/3055 (2013.01); G06F 11/0751 (2013.01)

(58) Field of Classification Search
CPC ............ G06F 11/0751; G06F 11/0754; G06F 11/076; G06F 11/3055; G06F 11/3409; G06F 11/3452
See application file for complete search history.

(56) References Cited

U.S. PATENT DOCUMENTS

| | | | | | |
|---|---|---|---|---|---|
| 4,937,763 | A * | 6/1990 | Mott | ...................... | G08B 23/00 700/47 |
| 5,958,009 | A * | 9/1999 | Friedrich | ............ | H04L 12/2602 709/224 |
| 6,108,800 | A * | 8/2000 | Asawa | ................ | G06F 11/3409 714/26 |
| 7,308,385 | B2 * | 12/2007 | Wegerich | ........... | G05B 23/0254 700/108 |
| 7,346,803 | B2 * | 3/2008 | Ide | ...................... | G06F 11/0709 714/38.13 |
| 7,380,177 | B2 * | 5/2008 | Goin | ................... | G06F 11/0709 702/184 |
| 7,401,263 | B2 | 7/2008 | Dubois, Jr. et al. | | |
| 7,484,132 | B2 | 1/2009 | Garbow | | |

(Continued)

OTHER PUBLICATIONS

Savic, et al., "Development of Software for Early Failure Detection and Prevention in Technical Systems", Retrieved at<<http://proceedings.informingscience.org/InSITE2010/InSITE10p385-392Savic811.pdf>>, Proceedings of Informing Science & IT Education Conference (InSITE) 2010, pp. 8.

(Continued)

*Primary Examiner* — Marc Duncan
(74) *Attorney, Agent, or Firm* — Henry Gabryjelski; Kate Drakos; Micky Minhas (57) ABSTRACT

A computer management system may track services on multiple computers executing the same workload. Various performance counters may be retrieved from the computers and analyzed to identify those with low deviations and low mean deviations. Statistical tests may then be used to compare the values of a particular computer to the deviation of the group of computers to identify outliers, which may indicate degraded performance and imminent failure of the computer. The management system may analyze any collectable performance related parameter to identify outlying systems.

20 Claims, 4 Drawing Sheets

(56) References Cited

U.S. PATENT DOCUMENTS

| | | | |
|---|---|---|---|
| 7,496,798 B2 | 2/2009 | Link et al. | |
| 7,590,513 B2* | 9/2009 | Jiang | G06F 11/008 703/2 |
| 7,752,013 B1* | 7/2010 | Broyles | G06F 11/3447 702/182 |
| 7,870,440 B2 | 1/2011 | Vacar et al. | |
| 8,055,952 B2 | 11/2011 | Avritzer et al. | |
| 8,069,370 B1* | 11/2011 | Li | G06F 11/0709 714/26 |
| 8,078,913 B2* | 12/2011 | Goldszmidt | G06F 11/0709 702/185 |
| 8,560,687 B1* | 10/2013 | Becker | G06F 11/3442 702/179 |
| 2001/0005821 A1* | 6/2001 | Ottosson | G05B 23/0235 702/185 |
| 2002/0177910 A1* | 11/2002 | Quarterman | H04L 12/2697 700/28 |
| 2004/0163079 A1* | 8/2004 | Noy | G06F 11/3409 717/154 |
| 2005/0120095 A1* | 6/2005 | Aman | H04L 67/1008 709/219 |
| 2005/0204397 A1 | 9/2005 | Miyazoe et al. | |
| 2006/0031521 A1 | 2/2006 | Wilk | |
| 2006/0161648 A1* | 7/2006 | Ding | G06F 11/3452 709/224 |
| 2007/0005297 A1* | 1/2007 | Beresniewicz | G05B 23/0235 702/181 |
| 2007/0016687 A1* | 1/2007 | Agarwal | G06F 9/5083 709/238 |
| 2008/0016412 A1* | 1/2008 | White | G06F 11/3409 714/48 |
| 2008/0097801 A1* | 4/2008 | MacLellan | G06F 11/3409 709/224 |
| 2008/0250265 A1 | 10/2008 | Chang et al. | |
| 2008/0307273 A1 | 12/2008 | Nguyen et al. | |
| 2009/0067324 A1 | 3/2009 | Licardie et al. | |
| 2010/0011254 A1 | 1/2010 | Votta et al. | |
| 2010/0083055 A1* | 4/2010 | Ozonat | G06F 11/0709 714/47.2 |
| 2010/0306597 A1 | 12/2010 | Goldszmidt et al. | |
| 2011/0107154 A1 | 5/2011 | Breitgand et al. | |
| 2011/0145657 A1 | 6/2011 | Bishop et al. | |
| 2011/0161743 A1 | 6/2011 | Kato | |
| 2011/0161744 A1 | 6/2011 | Nordstrom | |
| 2012/0042214 A1 | 2/2012 | Jacobs et al. | |

OTHER PUBLICATIONS

Palatin, et al., "Mining for misconfigured machines in grid systems", Retrieved at<<http://citeseerkist.psu.edu/viewdoc/download:jsessionid=4EC20C67A659517BB02D5628F2D288-F4?doi=10.1.1.136.4606&rep=rep1&type=pdf>>, Proceedings of the 12th ACM SIGKDD international conference on Knowledge discovery and data mining , Aug. 20-23, 2006,pp. 6.

Bodik, et al. , "Fingerprinting the datacenter: automated classification of performance crises", Retrieved at<<http://radlab.cs.berkeley.edu/w/upload/c/c4/11_-_Fingerprinting_the_Datacenter-_Automated_Classification_of_Performance_Crises_.pdf>>, Proceedings of the 5th European conference on Computer systems, Apr. 13-16, 2010, pp. 1-14.

Bodik, et al., "Automatically Building Robust Signatures of Performance Behavior for Small- and Large-Scale Systems", Retrieved at <<http://www.cs.berkeley.edu/~bodikp/publications/sysml08. pdf>>, Proceedings of the Third conference on Tackling computer systems problems with machine learning techniques, 2008, pp. 1-6.

Bodik, et al., "Combining Visualization and Statistical Analysis to Improve Operator Confidence and Efficiency for Failure Detection and Localization", Retrieved at<<http://ieeexplore.ieee.org/stamp/stamp.js?tp=&arnumber=1498055&userType=inst>>, Proceedings of the Second International Conference on Autonomic Computing (ICAC'05), 2005, pp. 12.

Non-Final Office Action, U.S. Appl. No. 12/965,934 mailing date Mar. 14, 2013, pp. 9.

Final Office Action, U.S. Appl. No. 12/965,934, mailing date Jul. 31, 2013, pp. 7.

\* cited by examiner

$$F_m = \left\| \frac{1}{T(M-1)} \sum_t \sum_{m` \neq m} \frac{x(m,t) - x(m`,t)}{\|x(m,t) - x(m`,t)\|} \right\|$$

and $$\hat{F} = \frac{1}{M} \sum_m F_m$$

FIG. 4

$$(M+1) \exp\left(-\frac{TM\gamma^2}{2(\sqrt{M}+2)}\right)$$

FIG. 5

$$\frac{1}{T(M-1)} \sum_t \sum_{m` \neq m} \frac{x(m,t) - x(m`,t)}{\|x(m,t) - x(m`,t)\|}$$

FIG. 6

EARLY DETECTION OF FAILING COMPUTERS

CROSS REFERENCE TO RELATED APPLICATIONS

This application is a continuation of and claims the benefit of and priority to U.S. application Ser. No. 12/965,934, entitled "Early Detection of Failing Computers", filed Dec. 13, 2010 by Nikolaj Bjorner et al., the entire contents of which are expressly incorporated by reference.

BACKGROUND

Managing computer hardware systems is a component of managing a computing infrastructure. In many large datacenters, several thousand or even hundreds of thousands of computers may operate as a hardware platform on which various applications may execute. A failed hardware component, such as a failed hard disk, processor, interface card, or other component, may cause a computer to degrade or cease performance. In order to compensate for the possibilities of failed components, various redundant designs may be implemented.

SUMMARY

A computer management system may track services on multiple computers executing the same workload. Various performance counters may be retrieved from the computers and analyzed to identify those with low deviations and low mean deviations. Statistical tests may then be used to compare the values of a particular computer to the deviation of the group of computers to identify outliers, which may indicate degraded performance and imminent failure of the computer. The management system may analyze any collectable performance related parameter to identify outlying systems.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A computer management system for similar devices executing similar workloads may use statistical analyses of any type of performance indicator to identify a device that may have failing hardware or software. The management system may analyze any existing performance indicators to determine if the parameter may be suitable for identifying abnormalities. After selecting the performance indicators, the management system may analyze the performance indicators to identify any problem devices.

The statistical analyses of the performance parameters may compare the deviation of a group of devices to the actual values or deviation of the individual devices. When the individual device differs from the group by a statistically significant margin, the device may be flagged as a potential problem.

In some cases, the performance parameters may be relatively constant over time. In such cases, the statistics for the performance parameter may not be recomputed each time an analysis may be performed.

In some cases, the performance parameters may be relatively constant from one device to the next, but may change over time. For example, a load balanced application may evenly distribute work to the various devices. As the load on the system fluctuates, some performance statistics may vary over time, but may closely correspond from device to device. In such cases, the deviation or other statistics for the group of devices may be calculated at each analysis cycle.

The management system may operate on any available performance indicator. In some cases, the performance indicators may be counters, such as fault counters or completion counters, which may increment as a fault is detected or as work units are completed, respectively. Other performance indicators may include instantaneous indicators, such as current processor load or response latency. Some indicators may be smoothed by averaging or various time series techniques.

Throughout this specification and claims, the term "performance indicator" may be used to refer to various forms of data gathered from a device operating a workload. In some cases, the performance indicator may be directly related to performance, while in other cases, the performance indicator may not have a direct relationship to performance. The term "performance indicator" is used to refer to any type of data gathered from a device.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
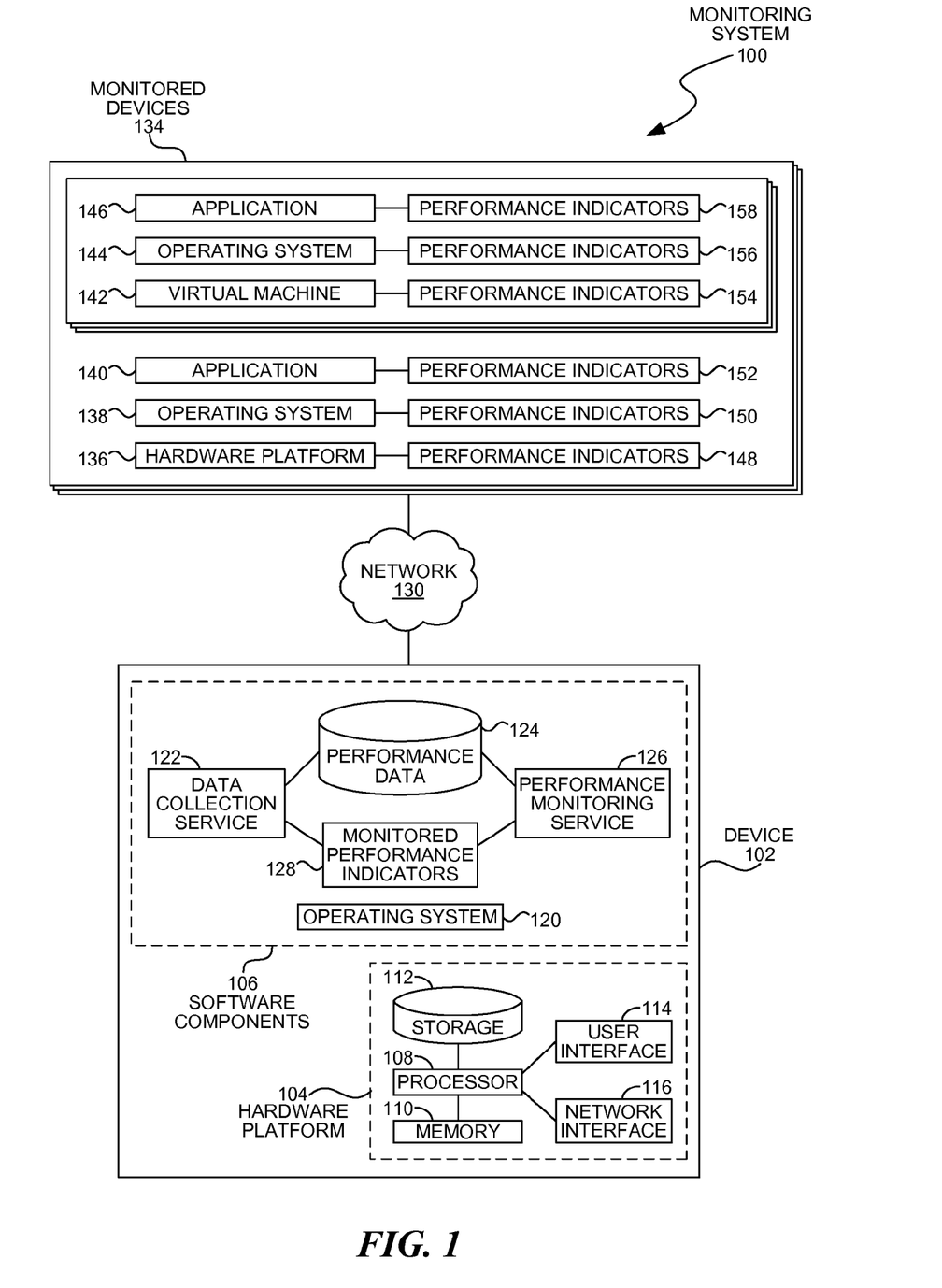
FIG. 1 is a diagram illustration of an embodiment showing a network environment with a monitoring system.

FIG. 1 is a diagram of an embodiment 100, showing a system that may include a monitoring system for multiple devices. Embodiment 100 is a simplified example of an environment that may be found in a datacenter or in another type of large application processing environment. The environment may have many devices that may be performing a similar workload.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

The devices may be monitored by tracking any available performance related parameter and identifying those parameters that may be suitable for monitoring. Outlying devices may be those devices with failed or failing hardware component, and those devices may be identified when the monitored performance parameters for the device are statistically different from the mean of the same performance parameters over the group of devices.

In many embodiments, the performance monitoring service may monitor similar or dissimilar devices that may execute the same or a similar workload. As the devices and workloads are more similar, the statistics used to identify hardware or other problems may be increasingly valid and useful.

The performance monitoring service may analyze any available statistic or metric that may relate to performance of the device. The statistics may be analyzed to identify those statistics that may have a small deviation or at least similar statistical behavior across multiple devices so that a deviation of one of the devices may indicate a hardware or other problem with the device.

The performance monitoring system may monitor various indicators that may be directly related to performance, such amount of work accomplished for a given unit of energy consumed, to metrics that may be tangentially related to performance, such as various error counters for hardware functions.

The initial analysis may apply various heuristics to screen the monitored indicators, and then may perform statistical analyses to identify those indicators that may provide statistically meaningful results.

The performance monitoring system may analyze any and all available indicators to select a set of monitored performance indicators. The indicators may be any type of metric or indicator that may relate to underlying hardware, a host operating system, applications executing on a host operation system, a virtual machine, a guest operation system executing with a virtual machine, applications executing within the guest operating system, as well as any other indicators.

Once the monitored performance indicators are identified, the indicators may be monitored and periodically analyzed. In general, hardware or other problems with individual devices may be determined by comparing an indicator for the individual devices to a mean, median, or other measure of the same indicator for a group of devices. When the indicator may be statistically different from the mean of the group of devices, the indicator for that device may indicate that device has a problem. The device may be flagged for a technician to analyze and repair or automatically removed from service.

The performance monitoring service may identify performance indicators that may be relevant to a particular set of devices operating a particular workload. In some cases, some performance related indicators may be discarded from analysis when those indicators may not yield statistically significant readings. Such a condition may exist when the indicators may have too few readings, when the statistics vary too much from one device to another or from one time period to another, or other conditions. Different embodiments may have different heuristics that may be used to remove certain types of indicators from consideration. In many embodiments, the effect of removing certain types of indicators may minimize false positive results as well as reduce the computational overhead for the performance monitoring service.

The data collection system and performance monitoring service may operate on a device 102. The device 102 is illustrated having hardware components 104 and software components 106. The device 102 as illustrated represents a conventional computing device, although other embodiments may have different configurations, architectures, or components.

In many embodiments, the device 102 may be a personal computer or server computer. In some embodiments, the device 102 may still also be a laptop computer, netbook computer, tablet or slate computer, wireless handset, cellular telephone, or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

The applications executing on the operating system 118 may include a data collection service 122 which may collect data in an active or passive mode from various monitored devices 134. The data collection service 122 may place the monitored data into a database containing performance data 124.

A performance monitoring service 126 may analyze the performance data 124 to identify a set of monitored performance indicators 128, and to analyze the monitored performance indicators 128 to identify a problem with one of the monitored devices 134.

The device 102 may monitor various monitored devices 134 that may be available over a network 130. The network 130 may be a local area network, wide area network, wireless or wired network, the Internet, or any other type of network.

The monitored devices 134 may be similar devices executing a similar workload. In one embodiment, the monitored devices 134 may be server computers executing a common workload in one or more datacenters. The common workload may be a large scale application. In some embodiments, multiple instances of an application may operate with a load balancer that may spread requests for the application to multiple devices. In another embodiment, each device may execute a portion of an application, such as a finite element analysis or large scale, distributed rendering application.

The more that the devices and workloads are similar, the more effective the performance monitoring service may be in identifying and isolating potential problems. The statistical analyses of the performance indicators may compare a current value of an indicator for an individual device to the deviation or generalized statistics for the group of devices. As the devices and workloads become more dissimilar, the deviations deviation between the devices may increase. Because the performance monitoring service compares deviation of individual devices against the deviations of the group, large deviations in the group of devices may yield less precise results.

In many large scale applications that execute within a datacenter, the server computers executing the application may be very similar and the applications may be identical instances of each other, especially when behind a load balancer. In such cases, the statistical analyses of the performance monitoring service 126 may be able to detect minute changes in performance and may be able to positively identify hardware problems with great precision. In many cases, the detection may occur at a lower threshold, which may result in earlier detection of a potential problem.

The monitored devices 134 are illustrated as a device as may be found in a datacenter. The monitored devices 134 may each have a hardware platform 136, which may be similar to the hardware platform 104 containing a processor, random access memory, and local storage.

In some cases, the monitored devices 134 may include an operating system 138. Some embodiments may execute a hypervisor natively on the hardware platform 136 and may host one or more virtual machines 142.

Some embodiments may have applications 140 that may execute on the operating system 138. The applications 140 may be a common workload performed by the monitored device 134, or may be an administrative service, utility application, data collection application, or other workload.

In many datacenter environments or other computer environments, server computers may be managed by using virtual machines 142. A virtual machine 142 may be a software simulation of a hardware system, and each virtual machine 142 may execute an operation system 144 on which various applications 146 may execute.

Virtual machines are often used in datacenters because the workload application 146 may be managed by moving virtual machines from one hardware platform to another, consolidating multiple virtual machines onto a single hardware platform, or other administrative tasks.

At each component of the monitored devices 134, various performance indicators may be gathered. For example, the hardware platform 136 may produce various performance indicators 148 that may include fault counters, current and average operational metrics, status indicators, and other hardware related indicators that may be retrieved by querying the hardware components directly. The host operating system 138 may produce various metrics and indicators that may also be used to indicate performance. These metrics and indicators may include summary statistics for overall device performance, as well as other indicators.

The application 140 may produce various performance indicators 152. The performance indicators 152 may include work accomplished by the application 140, as well as faults, error codes, latency, throughput, or other indicators. The virtual machines 142, guest operating system 144, and application 146 may also produce performance indicators 154, 156, and 158, respectively.

Embodiment 100 illustrates an example embodiment where a monitoring device 102 may collect data from various monitored devices 134. The monitoring device 102 may query the various performance indicators on the monitored devices 134 and may populate the performance data 124. In other embodiments, each monitored device 134 may have one or more data collection applications or services that may identify performance indicators and may transmit those indicators to the monitoring device 102.

In still other embodiments, one or more data collection services operating on another device may actively or passively collect data. An active data collection mechanism may send requests to a monitored device for one or more performance indicators. A passive data collection mechanism may receive performance indicators that may be transmitted by a service or application on the monitored device.

Embodiment 100 illustrates an example of a single device 102 that contains both the data collection service 122 and performance monitoring service 126. In some embodiments, the data collection service 122 may be performed by one device and the performance monitoring service 126 may be performed by another device.

In some embodiments, the performance monitoring service 126 may operate as an application or service on one of the monitored devices 134. In one such embodiment, the performance monitoring service 126 may operate in a separate virtual machine.

Figure 2:
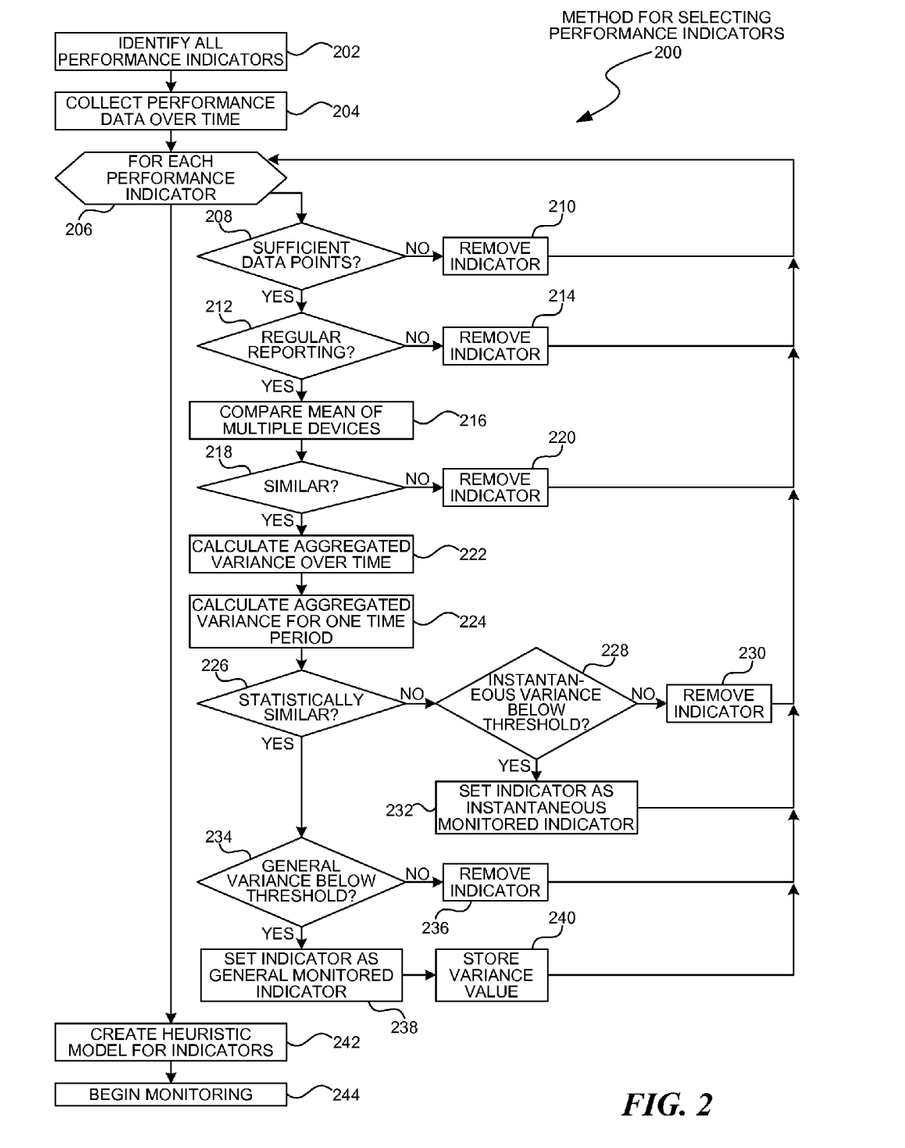
FIG. 2 is a flowchart illustration of an embodiment showing a method for selecting performance indicators.

FIG. 2 is a flowchart illustration of an embodiment 200 showing a method for selecting performance indicators. The process of embodiment 200 is a simplified example of one method by which a set of performance metrics may be identified that may give statistically significant identification of devices with hardware or other problems. The process of embodiment 200 is an example of some of the steps that may be performed by a performance monitoring service, such as the performance monitoring service 126 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is a simplified example of a general process to select performance indicators. The selection process may apply some heuristics to remove indicators that may not be statistically relevant. The performance indicators may be categorized into two broad categories: those indicators that do and do not vary significantly over time.

In block 202, all performance indicators may be identified. Because the process of embodiment 200 may identify statistically significant indicators from insignificant indicators, any type of metric that may be captured from a monitored device may be used. In many cases, the metrics may not be specifically directed towards performance, but may still be a statistically significant indicator for performance related problems.

The performance data may be collected over time in block 204. Each embodiment may collect performance data for a different amount of time. In embodiments where the workload may have certain periodicity, data may be collected over several periods of high and low demand. One example of periodicity may be a business application that may have a high demand during the business day but low demand outside of normal business hours. In such a case, data may be collected over several days or weeks.

Many computer management systems may collect and log operational data as a normal part of a monitoring system. Such operational data may contain many different types of indicators that may be analyzed by the method of embodiment 200.

Each performance indicator may be analyzed in block 206. For each performance indicator in block 206, several heuristics may be applied to screen out indicators.

If the performance indicator does not have data points in block 208, the indicator may be removed from consideration in block 210. In block 212, if the indicator is not regularly reported in block 212, the indicator may be removed from consideration in block 214.

In block 216, the mean of the indicator for each of multiple devices may be compared. If the means are not similar in block 218 within some threshold, the indicator may be removed in block 220.

The mean of the indicator for each device may be compared to identify those indicators that may be relatively constant but may vary from one device to the next. In order to identify outlying devices, an individual device may be compared to the statistics for a group of devices. When indicators may have a small deviation for a specific device, but may have a large deviation from device to device, the statistical analysis of the indicator may not yield meaningful results.

In block 222, an aggregated deviation for the indicator over a group of devices may be determined. The aggregated deviation may consider the indicator for each member of the group for multiple periods of time.

In block 224, an aggregated deviation for the indicator over the same group of devices may be determined for a single period of time.

If the deviation over time is statistically dissimilar to the deviation for a single time period in block 226, the indicator may be considered one that changes over time, but changes similarly for each of the group of devices. An example may be an indicator that may vary with the load, such as an indicator that may have one range of values during peak loading and another range of values during off-peak loading.

In block 228, if the deviation for a single time period is not below a specific threshold, the indicator may be removed from consideration in block 230. If the deviation is below the threshold, the indicator may be set as an instantaneous monitored indicator in block 232. An instantaneous monitored indicator may be an indicator that may be compared to a mean of a group of devices for a specific time period.

If the deviation over time is statistically similar to the deviation for a single time period in block 226, and the deviation is not below another threshold in block 234, the indicator may be removed from consideration in block 236. If the general deviation is below the threshold in block 234, the indicator may be set as a general monitored indicator in block 238 and the deviation value and other statistics may be stored in block 240.

A general monitored indicator may be an indicator that may not vary over time. An example may be an error rate for disk access or memory faults. Such indicators may be stable over time, and deviations from the norm may indicate a potential problem.

After analyzing all of the performance indicators in block 206, some embodiments may create a heuristic model for the indicators in block 242. The heuristic model may be automatically or manually generated. The heuristic model may define a ranking or relative importance of the selected monitored indicators, relationships between monitored indicators, or other definitions.

After selecting the performance indicators, the devices may begin monitoring in block 244.

Figure 3:
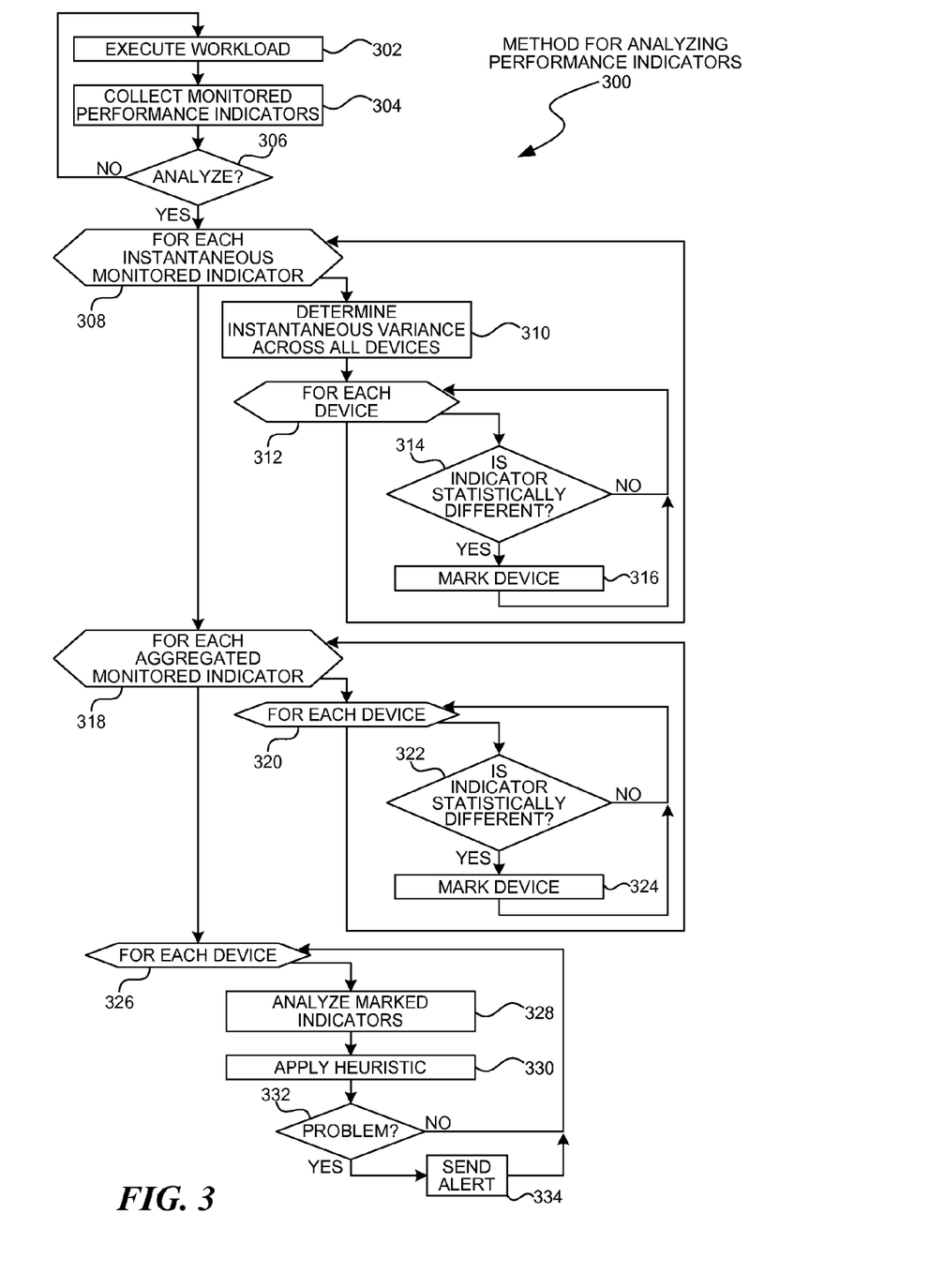
FIG. 3 is a flowchart illustration of an embodiment showing a method for analyzing performance indicators.

FIG. 3 is a flowchart illustration of an embodiment 300 showing a method for analyzing performance indicators. The process of embodiment 300 is a simplified example of one method by which a set of performance indicators may be periodically analyzed to identify a potential hardware or other problem with a device out of a group of devices operating a similar workload. Embodiment 300 is a simplified example of some of the steps that may be performed by a performance monitoring service, such as the performance monitoring service 126 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The method of embodiment 300 illustrates a method for analyzing both instantaneous monitored indicators and aggregated monitored indicators.

A workload may be executed in block 302 and the monitored performance indicators may be collected in block 304. Until an analysis may be performed in block 306, the process may return to block 302.

When an analysis may be performed in block 306, the various monitored indicators may be analyzed.

In block 308, instantaneous monitored indicators may be analyzed. An instantaneous monitored indicator may be an indicator that may change over time. For each instantaneous monitored indicator in block 308, an instantaneous or current deviation may be determined in block 310 across all devices. The instantaneous deviation may include mean, median, standard deviations, and other statistics that may describe the indicator across the group of devices.

For each device in block 312, if the device's indicator is not statistically different from the value across the group of devices in block 314, the indicator may not indicate a problem and the process may return to block 312.

If the device's indicator is statistically different from the value across the group of devices in block 314, the device may be marked as a potential problem in block 316.

The aggregated monitored indicators may be analyzed in block 318 in a similar fashion as the instantaneous monitored indicators. An aggregated monitored indicator may be one in which the monitored indicator may be expected not to vary over time.

For each aggregated monitored indicator in block 318, each device may be analyzed in block 320. If the indicator is not statistically different in block 322, the process may return to block 320 and ignore the indicator. If the indicator is statistically different in block 322, the device may be marked as a potential problem in block 324.

After analyzing all of the monitored indicators, each device may be analyzed in block 326. For each device in block 326, the marked indicators may be analyzed in block 328. In some embodiments, a heuristic may be applied in block 330 to determine the severity of the potential problem. If a problem exists in block 332, an alert may be issued to have a technician look into the potential problem in block 334.

The statistical analyses of the various monitored indicators may be performed using several different statistical techniques.

In one technique, assume that each monitored device reports D performance counters and that at time t=1 ... T, a sample of these counters x(m,t) in R^d for every machine m=1 ... M.

The null hypothesis is that there are probability measures {X(t)} defined over R^d such that x(m,t)~X(t).

In order to detect faulty machines, a statistical test may take the readings of the group of devices with similar workloads and gives a score to the "faultiness" of each of the devices. Each test may provide a certain threshold such that the device may be determined to be faulty with high probability if the score may be greater than the threshold.

Figure 4:
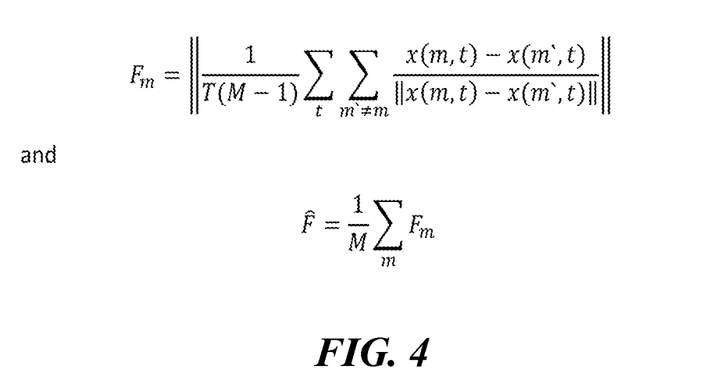
FIG. 4 depicts equations for an example test.

Equations for an example test are depicted in FIG. 4.

In the test, for each device m, the quantity $F_m$ may be the average of the distance to all other devices over all time points T.

Figure 5:
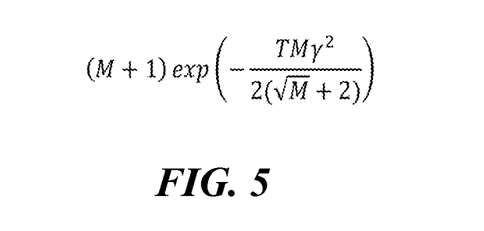
FIG. 5 depicts an equation associated with finding an outlying score for a device.

An outlying score for a device m may be defined as $S_m = F_m - \hat{F}$ and the probability $S_m$ being greater than γ when all the devices are working properly is smaller than the result of the equation depicted in FIG. 5.

Other statistical tests may include Tukey test, Least Outer Frequency ranking, variants of the Least Outer Frequency ranking with correlations over time intervals, as well as other statistical tests.

In some embodiments, the failure may be given a signature that represents the nature of the failure. The signature may be a vector that may represent the aggregation of the various failures. Using the example test above, the nature of a failure may be given as the equation depicted in FIG. 6.

Figure 6:
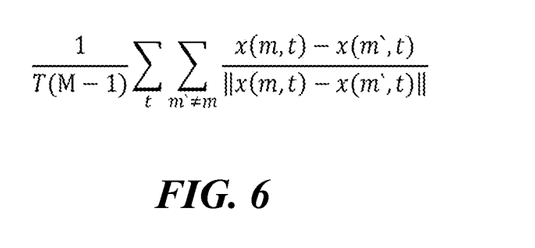
FIG. 6 depicts an equation for giving the nature of a failure.

The failure vector in FIG. 6 may be used to identify and differentiate between different types of failures.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method for use at a computer system, the computer system including a processor, the method for selecting performance indicators to monitor for identifying a problem during execution of an application, instances of the application load balanced on a plurality of other devices, the method comprising:
    for each of a plurality of devices, collecting operational data for the application over different periods when there are varied levels of demand for the application, the operational data including values for a plurality of different performance indicators;
    the processor identifying a subset of performance indicators that are statistically relevant, the subset of performance indicators identified from among the plurality of different performance indicators, including for each performance indicator in the subset of performance indicators:
        determining that an aggregated deviation over one period of time for the performance indicator is statistically similar to an aggregated deviation over multiple periods of time for the performance indicator; and
    setting each of the identified subset of performance indicators as monitored performance indicators.

2. The method of claim 1, further comprising for each performance indicator in the subset of performance indicators determining that the general variance for the performance indicator is below a specified threshold.

3. The method of claim 1, further comprising for each performance indicator in the subset of performance indicators determining that the performance indicator has a sufficient number of values to be statistically relevant.

4. The method of claim 1, further comprising creating a heuristic model for the monitored performance indicators.

5. The method of claim 4, wherein creating a heuristic model for the monitored performance indicators comprises creating a heuristic model that ranks some of the monitored performance indicators as more important relative to other of the monitored performance indicators.

6. The method of claim 1, further comprising monitoring the monitored performance indicators to determine if any of the plurality of devices is starting to fail.

7. The method of claim 1, further comprising for each performance indicator in the subset of performance indicators:
   for each device in at least a sub-plurality of devices, determining that an average value indicator for the performance indicator is statistically similar to an average value indicator for the performance indicator for other devices in the sub-plurality of devices, the sub-plurality of devices selected from among the plurality of devices.

8. A computer system, the computer system comprising:
   a processor;
   system memory couple to the processor, the system memory storing instructions that are executable by the processor; and
   the processor configured to execute the instructions stored in the system memory to select performance indicators to monitor for identifying a problem during execution of an application, including the following:
      for each of a plurality of devices, collect operational data for the application over different periods when there are varied levels of demand for the application, the operational data including values for a plurality of different performance indicators;
      identify a subset of performance indicators that are statistically relevant based on the values for the plurality of different performance indicators, the subset of performance indicators identified from among the plurality of different performance indicators;
      for each performance indicator in the subset of performance indicators, determine that an aggregated deviation over one period of time for the performance indicator is statistically similar to an aggregated deviation over multiple periods of time for the performance indicator; and
      set each of the identified subset of performance indicators as monitored performance indicators for the application.

9. The computer system of claim 8, wherein the processor configured to execute the instructions to identify a subset of performance indicators that are statistically relevant comprises the processor configured to execute the instructions to:
   for each performance indicator in the subset of performance indicators:
      for each device in at least a sub-plurality of devices, determine that an average value indicator for the performance indicator is statistically similar to an average value indicator for the performance indicator for other devices in the sub-plurality of devices, the sub-plurality of devices selected from among the plurality of devices.

10. The computer system of claim 8, further comprising the processor configured to execute the instructions to create a heuristic model for the monitored performance indicators.

11. The computer system of claim 10, wherein the processor configured to execute the instructions to create a heuristic model for the monitored performance indicators comprises the processor configured to execute the instructions to create a heuristic model that ranks some of the monitored performance indicators as more important relative to other of the monitored performance indicators.

12. The computer system of claim 8, further comprising the processor configured to execute the instructions to monitor the monitored performance indicators to determine if any of the plurality of devices is starting to fail.

13. The computer system of claim 12, further comprising the processor configured to execute the instructions to calculate a failure signature for at least one device that is starting to fail, the at least one device selected from among the plurality of devices.

14. The computer system of claim 8, further comprising the processor configured to execute the instructions to, for each performance indicator in the subset of performance indicators, determine that the general variance for the performance indicator is below a specified threshold.

15. The computer system of claim 8, wherein the processor configured to execute the instructions to identify a subset of performance indicators that are statistically relevant comprises the processor configured to execute the instructions to determine that each performance indictor in the subset of performance indicators has a sufficient number of values to be statistically relevant.

16. A computer program product for use at a computer system, said computer program product for implementing a method for selecting performance indicators to monitor for identifying a problem during execution of an application, instances of the application load balanced on a plurality of other devices, said computer program product comprising one or computer storage devices having stored thereon computer executable instructions that, when executed at a processor, cause said computer system perform the method including the following:
   for each of a plurality of devices, collect operational data for the application over different periods when there are varied levels of demand for the application, the operational data including values for a plurality of different performance indicators;
   identify a subset of performance indicators that are statistically relevant, the subset of performance indicators identified from among the plurality of different performance indicators, including for each performance indicator in the subset of performance indicators:
      determine that an aggregated deviation over one period of time for the performance indicator is statistically similar to an aggregated deviation over multiple periods of time for the performance indicator; and
   set each of the identified subset of performance indicators as monitored performance indicators.

17. The computer program product of claim 16, further comprising computer executable instructions that, when executed, cause said computer system to execute the instructions to create a heuristic model for the monitored performance indicators.

18. The computer system of claim 16, wherein computer executable instructions that, when executed, cause said computer system to identify a subset of performance indicators that are statistically relevant comprise computer executable instructions that, when executed, cause said computer system to determine that each performance indictor in the subset of performance indicators has a sufficient number of values to be statistically relevant.

19. The computer program product of claim 16, further comprising computer executable instructions that, when executed, cause said computer system to create a heuristic model for the monitored performance indicators, the heuristic model for ranking some of the monitored performance indicators as more important relative to other of the monitored performance indicators.

20. The computer program product of claim 16, further comprising further comprising computer executable instructions that, when executed, cause said computer system to monitor the monitored performance indicators to determine if any of the plurality of devices is starting to fail.

* * * * *